United States Patent [19]

Ernst et al.

[11] Patent Number: 5,554,205
[45] Date of Patent: Sep. 10, 1996

[54] AIR FILTER FOR THE INTERIOR OF A MOTOR VEHICLE

[75] Inventors: Volker Ernst, Sachsenheim; Arthur Klotz, Remseck; Rudolf Leipelt, Marbach, all of Germany

[73] Assignee: Filterwerk Mann & Hummel GmbH, Ludwigsburg, Germany

[21] Appl. No.: 291,857

[22] Filed: Aug. 17, 1994

[30] Foreign Application Priority Data

Aug. 19, 1993 [DE] Germany .......................... 43 27 834.5

[51] Int. Cl.⁶ .................................................. B01D 46/52
[52] U.S. Cl. .............................. 55/385.3; 55/481; 55/497; 55/502; 55/511; 55/DIG. 31; 454/158
[58] Field of Search .................... 55/385.3, 497, 55/499, 501, 502, 511, DIG. 31, 480, 481; 95/273; 454/156, 158

[56] References Cited

U.S. PATENT DOCUMENTS

| | | | |
|---|---|---|---|
| 4,373,635 | 2/1983 | Mules | 55/497 |
| 4,692,177 | 9/1987 | Wright et al. | 55/501 |
| 4,925,469 | 5/1990 | Clement et al. | 55/497 |
| 5,030,264 | 7/1991 | Klotz et al. | 55/502 |
| 5,125,941 | 6/1992 | Ernst et al. | 55/502 |
| 5,160,293 | 11/1992 | Koukal et al. | 454/69 |
| 5,160,519 | 11/1992 | Svensson et al. | 55/502 |
| 5,213,596 | 5/1993 | Kume et al. | 55/497 |
| 5,288,300 | 2/1994 | Muller et al. | 55/497 |

FOREIGN PATENT DOCUMENTS

| | | |
|---|---|---|
| 209086 | 1/1987 | European Pat. Off. . |
| 334719 | 9/1989 | European Pat. Off. . |
| 343445 | 11/1989 | European Pat. Off. . |
| 538602 | 4/1993 | European Pat. Off. . |
| 87/09100.3 | 10/1987 | Germany . |
| 9305767.9 | 6/1993 | Germany . |
| 2620148 | 12/1976 | United Kingdom . |
| 1485072 | 9/1977 | United Kingdom . |

*Primary Examiner*—Jay H. Woo
*Assistant Examiner*—Duane S. Smith
*Attorney, Agent, or Firm*—Evenson, McKeown, Edwards & Lenahan

[57] ABSTRACT

An air filter, particularly for ventilating the interior of motor vehicles, is provided. The air filter includes a housing having an unfiltered-air inlet and a clean-air outlet, as well as a filter medium folded in an accordion-like shape. The filter medium is arranged in a filter insert which has a surrounding seal. An adapter is integrated in the housing and also includes a surrounding sealing device to provide an effective seal between the unfiltered-air and clean-air sides of the housing. The filter insert is arranged in the adapter and is fixed in position via a cover flap of the housing.

8 Claims, 2 Drawing Sheets

AIR FILTER FOR THE INTERIOR OF A MOTOR VEHICLE

BACKGROUND OF THE INVENTION

This invention relates to an air filter and, more particularly, to an air filter for the ventilation of the interior of motor vehicles. The air filter includes a housing provided with an untreated-air inlet and a clean-air outlet, and a filter insert consisting of a filter medium folded in an accordion-type manner. The filter insert is provided with a surrounding sealing element for sealing-off the clean-air area.

A known air filter for motor vehicles is described, for example, in U.S. Pat. No. 5,160,293. The air filter comprises a holding device and a removable cover part. A filter element is situated between the holding device and the cover part. The holding device is provided with plug-type connections. The cover part is inserted into the plug-type connections. At the same time, the filter insert is clamped between the two parts via sealing surfaces which are arranged on the holding device and the cover part. The plug-in connection is an elastically deformable element which allows for a mechanical force locking connection between the holding device and tile cover part.

Furthermore, a filter device is known from German Patent document DE-GM 87 09 100 in which a filter insert is provided with tabs on its circumference. These tabs are clamped into a connecting point located between the filter cover and the filter base. The tabs are provided with suitable sealing devices so that a sealing effect is achieved between the housing base and the housing cover at the same time.

It is a disadvantage of the above-mentioned known air filters that they were developed and constructed for a specific installation purpose and, therefore, the respective air filter can only be used in a special housing.

SUMMARY OF THE INVENTION

There is therefore needed an air filter which overcomes the known disadvantages and which is easy to exchange and is suitable for a number of applications.

These needs are met by the present invention which provides an air filter, particularly one for the ventilation of the interior of motor vehicles, having a housing provided with an unfiltered-air inlet and a clean-air outlet, a filter insert consisting of a filter medium folded in an accordion shape, and an adapter which is inserted into the housing. The filter insert is arranged on the adapter.

An important advantage of the present invention is that, by means of the adapter, it is now possible to equip arbitrary housings and housing designs with a standardized filter. Whereas the filter and the filter insert must be changed on a regular basis, the adapter remains in the housing. The filter insert may be designed in a very simple manner and can therefore also be manufactured at low cost. With the present invention, it is no longer necessary to exchange an expensive filter insert which is adapted to a housing by high cost sealing profiles or plastic profiles. This saves a considerable amount of material which otherwise has to be disposed of. In addition, the manufacturing of standardized filter inserts is more economical than the manufacturing of specially designed filters.

It is also an important advantage of the present invention that the filter insert itself does not require any special fastening devices. The filter insert is fixed in its position inside of the adapter by the cover flap which closes off the entire housing.

Advantageously, the housing and the adapter are made of a thermoplastic material. The adapter may be fastened to the housing, for example, by means of metal clips, film hinges, snap connections or other similar devices.

According to an embodiment of the invention, the filter element is a paper or nonwoven plastic filter which is folded in an accordion-type manner. The filter has a surrounding sealing device made, for example, of PUR-foam or of a foam material. The filter element may have laterally arranged gripping tabs by which the filter element can be removed from the adapter.

It may also be advantageous to not provide the filter with any auxiliary devices to aid manual removal. In this case, a screw driver or the like must be used to pierce and lift out the filter in a lever-type manner in order to remove it. Because provisional cleaning of passenger compartment air filters should not be performed, unlike engine air filter which occasionally can be cleaned by, for example, beating the filter, the destructive removal of the filter insert provides a means to prevent any such provisional cleaning.

According to another embodiment of the invention, the adapter has cross webs for increasing its inherent stability. The cross webs are arranged on the clean-air side of the filter and therefore do not hinder the exchange of the filter insert.

A further embodiment of the invention provides at least two holding lugs on the adapter for fixing one side of the filter element. The filter element is pushed under these holding lugs and is held on the opposite side by the cover flap when it is closed.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
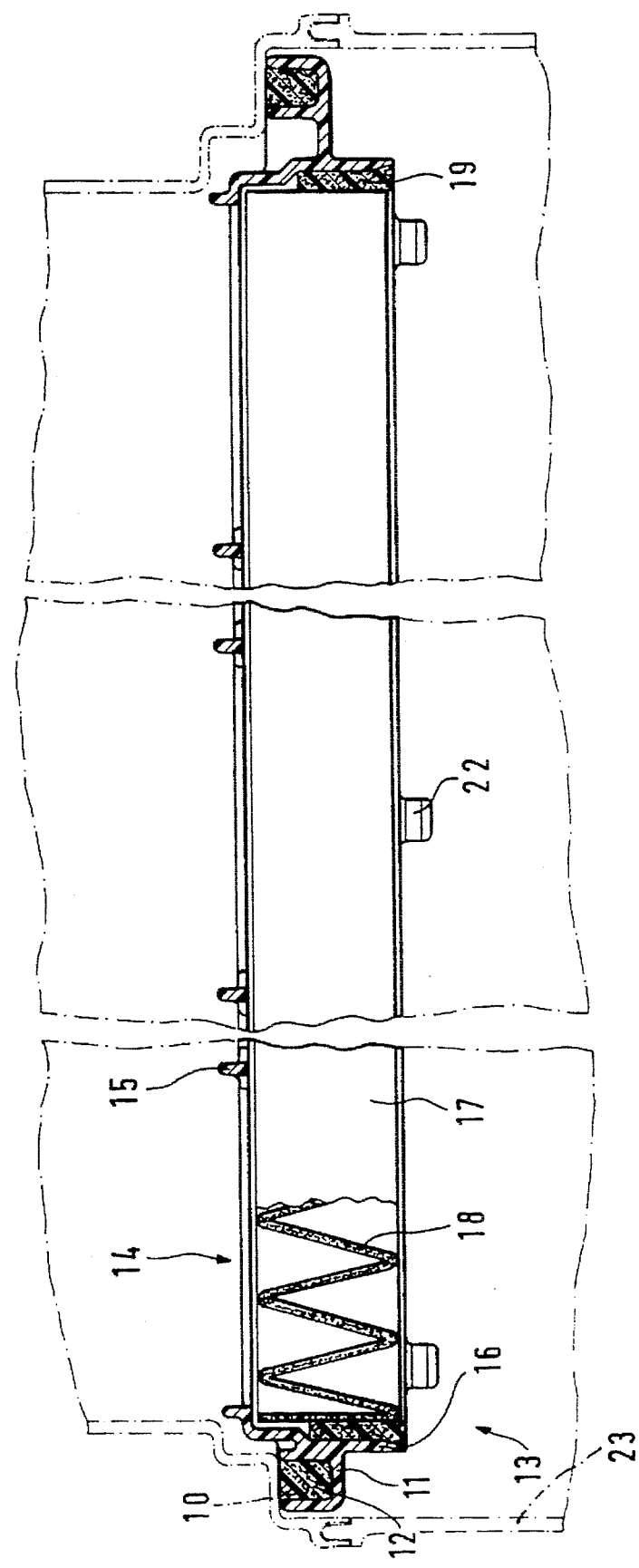
FIG. 1 is a longitudinal sectional view of a housing including an air filter for a vehicle interior according to the present invention.

The longitudinal sectional view of the present invention according to FIG. 1 illustrates a housing profile 10 represented by a dash-dotted line. In this case, the housing is shown only in a cut-out fashion. An adapter 11 is inserted in the housing 10. The adapter 11 has a surrounding sealing device 12. The adapter 11 is arranged such that its frame 16 opens to the unfiltered-air side 13 of the housing. On the clean-air side 14, the adapter 11 is provided with stiffening ribs 15. A filter insert 17 is inserted in the frame 16 formed by the adapter 11. The filter insert 17 is made of a filter paper or a nonwoven material 18 which is folded in an accordion shape. The filter insert 17 is provided with a surrounding seal 19.

Figure 2:
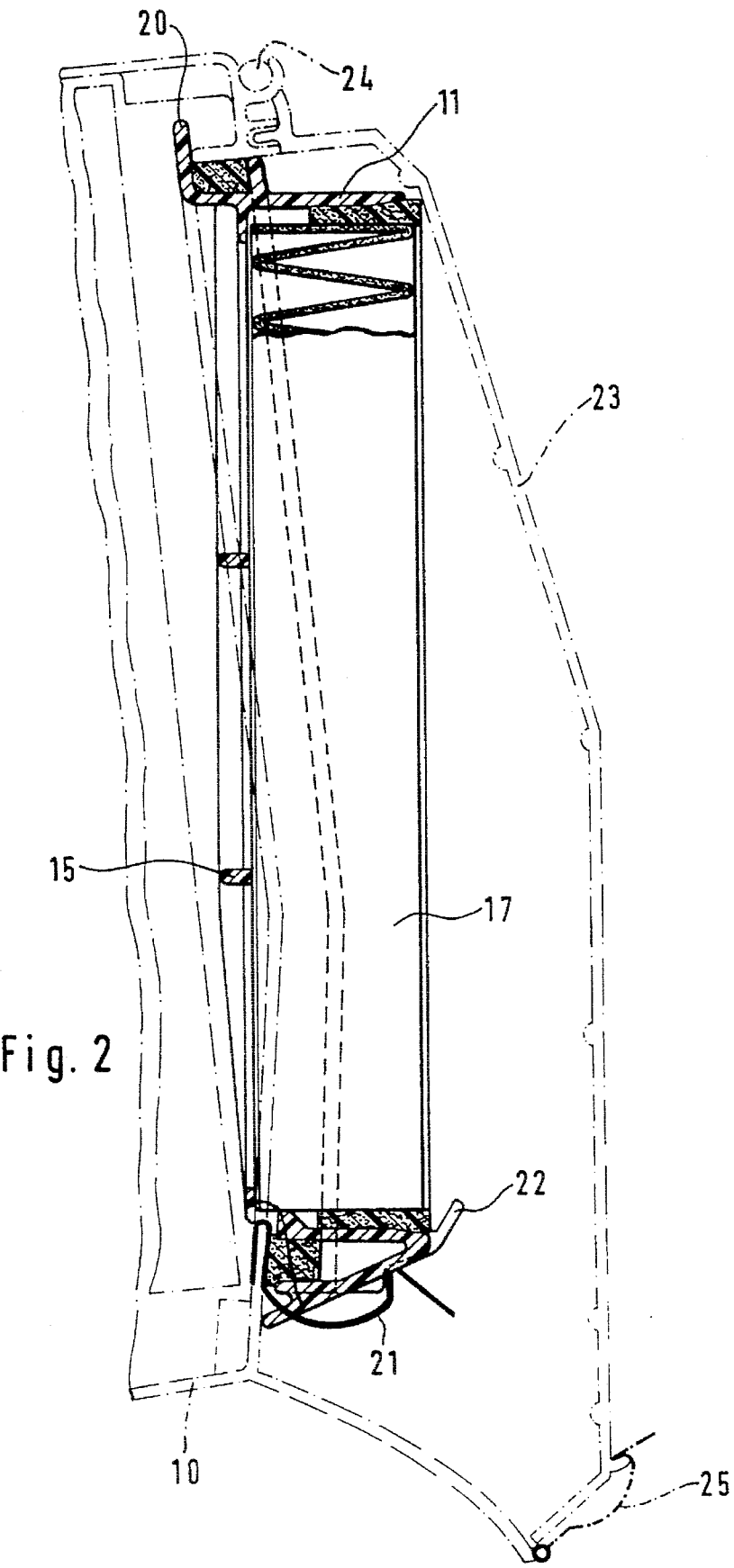
FIG. 2 is a cross-sectional view of an air filter for the interior of a motor vehicle according to the present invention.

FIG. 2 is a sectional view of the air filter according to the present invention. In this case also as with FIG. 1, the housing 10 is represented in outline form by a dash-dotted line. The adapter 11 is fastened in the housing 10 using a web 20 as shown at the top side of FIG. 2. The web engages in an undercut formed by the housing 10. On the opposite side, the adapter 11 is secured by a spring clip 21 to the housing. As a result, the adapter 11 is detachably arranged in the housing and can be removed as required. The filter insert 17 arranged in the adapter 11 is secured at one end against falling out of the housing, as shown at the bottom side of FIG. 2. On the top side, the filter insert 17 is secured via the housing cover 23 in its closed state. The housing cover 23 is fastened to the housing via a hinge 24. The cover 23 may be pivoted about the hinge 24 to open the housing for removal of the filter insert 17. The cover 23 can be closed using spring clamps 25.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An air filter for use in ventilating an interior of a motor vehicle, comprising:

a housing having an unfiltered-air inlet and a clean-air outlet;

a filter insert having a pleated filter medium; and an adapter inserted into said housing and arranged therein, said adapter having a surrounding seal element for providing a seal between said unfiltered-air inlet and said clean-air outlet, said filter insert being removably arranged in said adapter, and said filter insert having a sealing element surrounding said filter insert for providing a seal with respect to said adapter.

2. An air filter according to claim 1, further comprising a snap connection for fastening said adapter to said housing.

3. An air filter according to claim 1, further comprising a cover flap arranged on said housing, said cover flap fixing said filter insert in position in said adapter.

4. An air filter according to claim 1, wherein said housing and said adapter are made of a thermoplastic material, and further comprising metallic spring clips for clipping said adapter to said housing.

5. An air filter according to claim 1, wherein said filter element is one of a paper and a nonwoven plastic filter and wherein said sealing element is made of PUR-foam on a polyester base.

6. An air filter according to claim 1, wherein said adapter includes cross Webs for increasing stability of said adapter.

7. An air filter according to claim 1, further comprising at least two holding lugs provided on said adapter for fixing one side of said filter element with respect to said adapter, and a cover flap for fixing an opposite side of said filter element with respect to said adapter.

8. An air filter according to claim 1, wherein said filter element is one of a paper and a nonwoven plastic filter and wherein said sealing element is made of a foam material.

\* \* \* \* \*